United States Patent [19]

Gavin et al.

[11] Patent Number: 4,859,482

[45] Date of Patent: Aug. 22, 1989

[54] METHOD FOR PRODUCING A PRODUCT FROM OIL SEED

[75] Inventors: Michel Gavin, Wil; Urs Grunder, Oberuzwil; Karl Ulmer, Wil, all of Switzerland

[73] Assignee: Gebruder Buhler AG, Uxwil, Switzerland

[21] Appl. No.: 248,264

[22] Filed: Sep. 21, 1988

Related U.S. Application Data

[63] Continuation of Ser. No. 157,097, Feb. 9, 1988, abandoned, which is a continuation of Ser. No. 733,952, May 14, 1985, abandoned.

[30] Foreign Application Priority Data

May 22, 1984 [CH] Switzerland ............ 2513/84

[51] Int. Cl.$^4$ .......................................... A23L 1/20
[52] U.S. Cl. .................................. 426/518; 241/66; 426/634
[58] Field of Search .............. 426/518, 460, 634, 598, 426/461, 482; 241/66, 67

[56] References Cited

U.S. PATENT DOCUMENTS

| | | | |
|---|---|---|---|
| 1,287,654 | 12/1918 | Dodds | 426/518 |
| 1,512,466 | 10/1924 | Iff | 241/67 |
| 1,885,251 | 11/1932 | Gaiser | 241/38 |
| 2,026,676 | 1/1936 | Gill | 426/460 |
| 2,802,738 | 8/1957 | Anson et al. | 426/632 |
| 3,288,614 | 11/1966 | Miles | 426/598 |
| 3,331,905 | 7/1967 | Hint | 241/15 |
| 3,399,997 | 9/1968 | Okumura et al. | 426/598 |
| 3,645,745 | 2/1972 | Magnino et al. | 426/431 |
| 3,809,771 | 5/1974 | Mustakas | 426/364 |
| 3,865,802 | 2/1975 | Mustakas | 260/123.5 |
| 4,427,710 | 1/1984 | Terada et al. | 426/634 |
| 4,556,573 | 12/1985 | Bartesch et al. | 426/482 |

FOREIGN PATENT DOCUMENTS

| | | | |
|---|---|---|---|
| 405326 | 10/1934 | Belgium . | |
| 2195407 | 3/1974 | France . | |
| 2224209 | 10/1974 | France . | |
| 2386350 | 11/1978 | France . | |
| 56-124360 | 9/1981 | Japan . | |
| 58-71859 | 4/1983 | Japan . | |
| 8027 | of 1915 | United Kingdom | 426/598 |
| 500637 | 5/1937 | United Kingdom | 426/461 |
| 1400470 | 7/1975 | United Kingdom . | |
| 1449235 | 9/1976 | United Kingdom . | |
| 1566854 | 5/1980 | United Kingdom . | |

OTHER PUBLICATIONS

"Diagram 84", Buhler-Buhler-Miag.
Belitz, H. -D. and Grosch, W., "Lehrbuch der Lebensmittelchemie", 730, para. 21.3.2.5 (1982).

*Primary Examiner*—George Yeung
*Attorney, Agent, or Firm*—Merchant, Gould, Smith Edell, Welter & Schmidt

[57] ABSTRACT

For the recovery of the protein from oil seeds, particularly from soy beans, grinding is effected under omission of a suspension liquid, i.e. substantially in dry condition of the oil seed, by applying pressure and friction until the cell walls of the oil seed are opened. This is preferably realized on a friction roller refiner comprising at least two rollers of different speed, i.e. for example on a three-roller-refiner, a five-roller-refiner or also at least two two-roller-refiners. Surprisingly, in this way the expenditure in energy is reduced and the quality of the product is improved.

12 Claims, No Drawings

METHOD FOR PRODUCING A PRODUCT FROM OIL SEED

This is a continuation of application Ser. No. 157,097, filed 2/9/88, abandoned, which was a continuation of Ser. No. 733,952 filed 5/14/85 abandoned.

FIELD OF THE INVENTION

The invention relates to a method for producing a product from an oil seed being rich in protein, particularly from soy beans, in which the seed is ground to a powder. Such oil seeds comprise, for example, sun flower kernels, pea nuts, coconuts, winged beans and particularly soy beans. If, in this connection, "beans" are mentioned, the raw product is not restricted to entire beans, but also bean halves or broken beans may be the initial material.

BACKGROUND OF THE INVENTION

Oil seeds and especially soy beans are often processed in the foodstuff industry, thereby grinding them in dry condition by means of hammer mills or disintegrators, or by treating them in an extruder. The particle sizes thus obtained are relative coarse, the cell membranes are practically not opened or disintegrated, and a fine powder, as is necessary to produce soy milk and soy milk products, cannot be obtained.

In order to produce soy milk, generally colloid mills are used (vide e.g. U.S. Pat. No. 3,399,997, column 2, lines 59 ff), whereby grinding is effected in wet condition of the soy beans. From the suspension obtained, either drinkable soy milk is produced or the soy milk is coagulated to produce the so-called "tofu"-cheese. In such a wet processing, the protein contained in the soy beans (or similar oil seeds) become dissolved, whereas the cell walls have to be filtered or pressed off. In doing so, a relative high loss of protein will result, amounting up to 50% percent. A further disadvantage of the known wet-grinding method resides in that the combination of starch and proteins contained in the oil seeds leads to a considerable viscosity resulting in a high power consumption of the colloid mills on the one hand, and to the need to dry the product on the other hand, if only the powder should be obtained and not a milk.

In fact, attempts have also been made to extract the protein contained in soy beans by a chemical means. In order to obtain a better effect of the extraction solvent, in this connection it has been proposed to grind the soy beans in dry condition (e.g. U.S. Pat. Nos. 2,802,738, 3,288,614 or 3,645,745). Just because a mechanical extraction of the protein could not be obtained by the methods used heretofore, a subsequent chemical treatment was required. Such processes have also been proposed for debittering soy beans, but such chemical processes are not always in accordance with the governmental rules concerning foodstuffs.

SUMMARY OF THE INVENTION

It is therefore an object of the invention to create a simple method by means of which powders, and in consequence also other products, are obtained from oil seeds, particularly from soy beans, with low expenditure of energy and a high yield.

This object is attained according to the invention in a surprisingly simple manner in that the step of grinding is effected without any suspension liquid and substantially in dry condition of the oil seed (irrespective of its natural moisture content) under application of pressure and friction until the cell walls are opened, i.e. disintegrated.

Thus, there are substantially four factors necessary to solve the problem, namely to grind in dry condition, not only under pressure, but also applying friction, until the cells are opened, i.e. until the cell walls are disintegrated. The reason is that the individual protein particles within the cellular structure are already of a relatively small size, and this cellular structure will be opened and disintegrated by the dry application of pressure and friction to such an extent that substantially all of the protein powder is automatically obtained. Due to the extensive disintegration of the cellular structure, however, it is no longer necessary to filter or to press the cell walls off which step represented an essential factor until now, why the yield of protein was so small. Moreover, there is a further favorable effect: By opening the cell walls, the fat contained in the the cells will be liquefied by the friction applied so that grinding can be realized with less expenditure of energy.

Although the step of dry-grinding, in principle, could also be effected in an attrition mill, it is prefered to carry out this grinding step in a friction roll refiner comprising at least two, preferably at least three, rollers of different speed in relation to the respective adjacent one. In this way, customary friction roll refiners may be applied, e.g. three-roll-refiners or five-roll-refiners, as used for grinding cacao or dyes. Also two-roll-refiners may be used, particularly in an arrangement where at least two of them are connected in series to form at least two grinding stages so that the dry-grinding is effected in at least two steps. Such friction roll refiners typically can have a relationship of the peripheral speeds of adjacent rollers between about 1:1.5 to 1:5 in order to exert sufficient friction.

A particularly fine powder of high quality and of good digestibility is obtained, when the oil seeds, and preferably soy beans, are ground in at least two steps or stages. In this connection, it is prefered, first to subject the seed to a pressing or flaking step, especially on a flaking roller mill, after which step the proper grinding of the flaky product thus obtained will take place under the application of pressure and friction. By the pressing action a flaky product is obtained that partially comprises agglomerates of the seed particles which are disintegrated in the following grinding step under pressure and friction.

As long as a debittering step has not already been carried out before, or such a step can be omitted, the product may be heated simultaneously with the application of pressure which procedure will result in two different effects, namely a debittering effect on the one hand, and—with a suitable temperature—also a partial gelatinizing effect of the starch contained whereby the quality of the resulting product will be improved. This step is best realized by grinding the seed (preferably soy beans) by means of rollers, at least some of which, preferably the rollers of a flaking roller mill, are heated. Of course, it is equally possible to heat additionally or alternatively the rollers of the friction roll refiner, since such refiners are usually equipped with flow channels for a heat carrier. Good results will be obtained, when the rollers are heated up to a temperature above 100° C., preferably to a temperature between 110° and 200° C., particularly up to about 150° C., the latter value being understood with a possible tolerance of ±10%.

A further advantageous measure resides in that the seed, and again particularly soy beans, are moistened before being heated, the seed preferably being brought to a moisture content between 20% and 50% by weight, especially to about 25% (also with a possible tolerance of about 10%, i.e. ±2.5% of the moisture content). Also this measure has a dual effect. On the one hand, roasting of the seed is easier avoided, on the other hand the vapors developing in the subsequent heating treatment promote the removal of bitter substances, that may be present and which are entrained by the vapors and are, in case, exhausted.

From the British Specification No. 1,449.235 it has become known to subject soy beans to an impact crushing treatment after a heat treatment. In connection with the present method, it has been found favorable to combine the present method with this known method by subjecting the oil seeds, particularly soy beans, to an impact crushing treatment before dry-grinding them, the impact crushing being preferably applied to heated seed, preferably immediately after heating the seed above 100° C., for instance between 100° C. and 150° C., which treatment suitably is effected for no more than 10 minutes. Preferably, the heating treatment is carried out while the seed is in a fluidized condition, i.e. in a fluidized bed, wherein—in the case of a seed having a hull, such as soy beans—the seed is unhulled. The combination of the method known from the above British Specification with the method according to the present invention is particularly favorable, because the soy beans are already divided into bean halves or fractions by the action of the impact. Furthermore, the heating treatment, preferred in this connection, is beneficial to the debittering of the seed. The product is moistened either before the treatment in the fluidized bed or after the impact crushing. In the first case, the succession of treatment steps may be effected quickly enough that, subsequent to the impact crushing of the seed, the hot product may be ground. The hot-grinding of the oily seeds has the advantage, that its fat content is liquefied so that the grinding operation is facilitated and the energy consumption is further reduced.

Now, if the powder, obtained by grinding, subsequently is suspended within a drinkable liquid, particularly in water, a soy milk may be obtained which is much more nutritive in relation to common products and/or a higher yield of a milk of a comparable quality may be obtained. The reason is simply that in comparison with the usual wet-grinding procedure there is no filtering or pressing off step so that the loss of foodstuffs is avoided that customarily was connected with the known methods for producing soy milk. It has been found that with such a milk an excellent tofu product may be obtained, if the milk after the suspension step is coagulated. The suspending operation may be facilitated and simplified, if the powder to be suspended is previously ground to a particle size with which it may be suspended without forming sediments so that measures for separating a sediment may be avoided. The particle sizes obtained with the method according to the invention and being necessary for the complete suspension comprise a relative large range, substantially as a consequence of the peculiarities of the present method on the one hand, and of the usual methods for determining the particle sizes on the other hand. That is that the friction applied during grinding forms micro-platelets having a very small dimension in one direction, but which may have a very large extension in another direction. Such platelets, however, are suspendable without any difficulty, although being retained—when the particle size is determined by means of sieves—by a sieve of a mesh aperture of 100 micrometers. In general, it is prefered to maintain the particle size of the product ground so that the maximum portion within the particle-size spectrum is below 200 micrometers, particularly below 100 micrometers, e.g. between 25 and 50 micrometers. Instead of water as a drinkable liquid, also other liquids may be used, for instance whey. If tofu-cheese should be produced, the coagulation of the soy milk may be done using calcium sulfate under heating, as is customary.

In summary, the following advantages of the method according to the invention may be mentioned:
small expenditure of energy;
high yield and good exploitation of the soy beans;
in comparison with the known wet-grinding methods, special hygienic measures are no longer required, there is no necessity to use corrosion resistant material and to work in wetness and in water resistant rooms;
reduce in price of the products; and
increase in quality of the products.

As an example, the method may be carried out in such a way that substantially untreated soy beans, only after a first purification treatment—in case also, after adjusting the moisture content—are heated in a fluidized bed and then hulled by impact crushing, as is described in the British Specification No. 1,449.235. By the heat treatment, the soy beans are already somewhat debittered, whereas the impact crushing may be effected so that the soy beans are not only unhulled, but are also split into bean halves whereby even big fragments may be formed.

Then, the kernel portions are fed to a flaking roller mill. On account of the previous heating treatment, the fat content of the beans is at least partially liquefied, and in virtue of the adjustment of the moisture content of the beans, if necessary by adding moisture, the product to be ground is weakened. Generally, the beans may have a moisture contents of at least 6 to 12% by weight, e.g. 8 to 9%, (according to the above-mentioned British Specification), but suitably the contents of moisture is even higher and amounts between 25 and 50% by weight, particularly about 30%. By weakening the beans, grinding is facilitated in the first grinding step on the flaking roller mill, and the energy consumption is reduced. The rollers of the flaking roller mill are preferably heated, suitably up to a temperature above 100° C., e.g. between 110° C. and 200° C. A temperature of about 150° C., in case even somewhat higher (160° C. or 170° C.), has been found favorable for achieving a debittering and gelatinizing effect, but, in cases, the product to be treated may still have such an amount of heat energy from the foregoing heating treatment in the fluidized bed, especially when transferred immediately from the latter to the flaking roller mill, e.g. within a period of 5 minutes in maximum, that heating of the rollers is not necessary. The same applies to the following grinding stage, where, however, also at least one roller may be heated, if desired.

Although an intermediate grinding step may be provided, generally fine grinding is then effected on a friction roll refiner. This refiner may comprise three rollers of different circumferential speed, or also four or even five rollers where each roller is driven with a higher speed than the foregoing one. In the simplest case, however, two rollers may be sufficient, in case also a series of at least two two-roll-refiners.

For producing soy cheese (tofu), the soy powder obtained is suspended in a drinkable liquid, preferably water. This suspension remains free of sediments, if the soy powder is previously grinded to a particle size of 200 micrometers in maximum (main fraction), but mostly of 100 micrometers in maximum or even a main fraction between 25 and 50 micrometers. The milk thus obtained is boiled in usual manner, and is then coagulated with Ca SO$_4$, after which step it is sieved (or filtered) and pressed. From this treatment a whey will result on the one hand, and the desired tofu-cheese on the other hand, the latter being very nutritive and being produced with a high yield (in relation to the raw product). Test have resulted in yield rates of 75% to 80% of the dry substance or 85% to 90% of the protein.

It is to be understood that also other products from oil seed, especially from soy beans, may be produced, such as sterilized milk (e.g. soy milk), soy yogurt, desserts from oil seeds (e.g. aromatic soy pudding), various sorts of cheese (soy cheese similar to camembert, gorgonzola, munster-cheese and the like), a substitute for cream, soy-ice cream, and so on. Similar products to the ones described as being made from soy beans, may be obtained from other oil seeds having a similar cell structure, above all from oil seeds to be treated in a like manner as soy beans.

The following table shows the results of various experiments for producing soy cheese proceeding from a powder or flour obtained with the method described above.

50%. The cheese obtained had a good taste and a gel-like texture. The color was white-yellowish (also in examples 2 to 5).

EXAMPLE 2

Encymatic full-fat coarse meal of soy beans were sieved on a sieve of a mesh size of 1 mm. This meal has been adjusted to a moisture content of 11% and was then refined by passing twice a 5-roll-refiner. Afterwards, this product has been stirred in cold water. The taste of the cheese was bitter, the texture slightly floury. The yield of cheese in this and the following examples was 80.8%.

EXAMPLE 3

The same meal has been used, as in example 2. Refining has been made by passing it only once through a 3-roll-refiner. Afterwards, the product has been stirred in boiling water. The taste was only slightly bitter, color and texture were as in example 2.

EXAMPLE 4

Full-fat coarse meal of soy beans sieved on a sieve with a mesh size of 3 mm has been treated as in example 2 and has been stirred in boiling water. Taste, color and texture of the cheese obtained were as in example 3.

EXAMPLES 5 and 6

With the known methods it is impossible to obtain a tofu from encymatically inactive soy flour. These examples, however, will prove that the flour—after a refining treatment—is again able to react. In example 5, taste

|  |  | soy flour encymatically active (89,9% dry substance) | | | soy flour inactive (91,5% dry subst.) | |
| --- | --- | --- | --- | --- | --- | --- |
|  |  |  |  |  | 5 | 6 |
| raw material example treatment | soy milk 1 | 2 5-roll-refiner | 3 3-roll-refiner | 4 5-roll-refiner | 5-r-r. NSI: 28.9% urease: 0.86 | 5-r-r. 12.1% 0.09 |
| amount/water | 500 ml of milk (52 grams of dry substance) | 50 grams/ 500 ml | 70 grams/ 1000 ml | 70 grams/ 1000 ml | 70 grams/ 1000 ml | 70 grams/ 1000 ml |
| temperature at stirring in | — | 15° C. | 90° C. | 90° C. | 90° C. | 90° C. |
| boiling time | — | 5 min. | 10 min. | 10 min. | 10 min. | 10 min. |
| coagulation agent | 0.3% Ca SO$_4$/65° C. | " | " | " | " | " |
| coagulation time/temp. | 1 hour/65° C. | " | " | " | " | " |
| syneresis | 3 hours/65° C. | " | " | " | 2 hours/ 65° C. | 2 hours/ 65° C. |
| duration of pressing | 3 hours | 3 hours | 15 hours | 15 hours | 16 hours | 16 hours |
| ratio of serum/ dry substance | 265 ml/10.6 grams | 280 ml/ 6.5 g | 610 ml/ 12.44 g | 680 ml/ 11.6 g | 580 ml/ 10.78 g | 610 ml/ 11.59 g |
| ratio of weight cheese/dry subst. | 192 g/43.9 g | 171 g/ 35.0 g | 340 g/ 66.5 g | 340 g/ 61.5 g | 252 g/ 47.0 g | 272 g/ 52.7 g |
| yield of dry substance | 39.8%* | 84.4% | 84.2% | 84,2% | 81.6% | 81.9% |

The following explanations are given to the above examples.

EXAMPLE 1

The cheese has been produced in usual manner starting from soy milk in order to have a comparison. For obtaining the soy milk, 500 g of cotyledons have been soaked in 5 liters of water, and have been cooked and pressed, whereby 2.25 liters of soy milk with 10.4% dry substance have been produced. The yield of milk was 49.3%. In a mass production the yield mostly is above and color were as in example 3, the texture was gel-like. In example 6 the bitter taste of the cheese was completely removed, i.e. the tofu had a good taste; the color was, however, slightly brownish like that of toasted bread. The texture was gel-like.

It should be mentioned that in all examples pressing has been effected at room temperature.

What we claim is:

1. A method of refining oil seeds comprising protein-containing cells having outer cell walls; said method including the steps of:
   (a) providing dry kernel material of said oil seeds;
      (i) said dry kernel material comprising whole kernels, pieces of kernels, flakes of kernels, or mixtures thereof;
      (ii) said dry kernel material having a moisture content of no greater than about 50% by weight;
   (b) grinding said dry kernel material by passage between surfaces of adjacent rotating rollers of a friction roll refiner wherein rotation of adjacent rollers is maintained at different surface speeds and substantial pressure is simultaneously applied to said dry kernel material; and,
   (c) continuing said grinding until said cell walls are substantially completely opened and disintegrated to release protein contained therein as a substantially dry powder;
   (d) whereby oil seeds are refinable to a powder through a substantially dry process.

2. The method according to claim 1 including:
   (a) providing a ratio of relative surface speeds, of said surfaces of adjacent rotating rollers, of between 1:1.5 and about 1:5.

3. The method according to claim 1 including a step of:
   (a) compressing said kernel material to form a flaky product of said dry kernel material prior to said passage between surfaces of adjacent rotating rollers at different surface speeds;
   (b) wherein said steps 65(b) and 65(c) of grinding and continuing said grinding include operation on said flaky product.

4. The method according to claim 3 wherein said step of compressing said kernel material to form a flaky product includes:
   (a) providing a flaking roller mill; and,
   (b) feeding said kernel material through said flaking roller mill.

5. The method according to claim 4 wherein:
   (a) said step of providing a flaking roller mill includes providing such a mill with at least two rollers between which said seeds are compressed;
      (i) at least one of said rollers being heated to a temperature of at least 100° C.; and,
   (b) said step of compressing said kernel materials to form a flaky product includes heating said kernel material with a heated roller.

6. The method according to claim 3 wherein:
   (a) said step of compressing said kernel material to form a flaky product includes passing said material between flaking rollers and heating at least one of said flaking rollers to a temperature of at least 100° C.

7. The method according to claim 6 wherein:
   (a) said step of compressing said kernel material to form a flaky product includes heating at least one of said flaking rollers to a temperature of between about 100° C. and 150° C.

8. The method according to claim 1 wherein:
   (a) said step of grinding said dry kernel material includes heating said kernel material by passage between rollers at least one of which is heated to a temperature of at least 100° C.

9. The method according to claim 8 wherein:
   (a) said step of grinding said dry kernel material includes heating said kernel material by passage between rollers at least one of which is heated to a temperature of between about 100° C. and 150° C.

10. The method according to claim 9 wherein:
    (a) said heating is effected during about 5 minutes in maximum.

11. The method of refining oil seeds according to claim 1 wherein:
    (a) said step of providing kernel material with a moisture content of no greater than about 50% by weight includes providing kernel material with a water content of between about 25% and 50% by weight.

12. The method according to claim 11 wherein:
    (a) said step of providing kernel material with a water content of between about 25% and 50% by weight includes moistening said kernel material to a water content of at least about 30% by weight.

* * * * *